Figure 15:
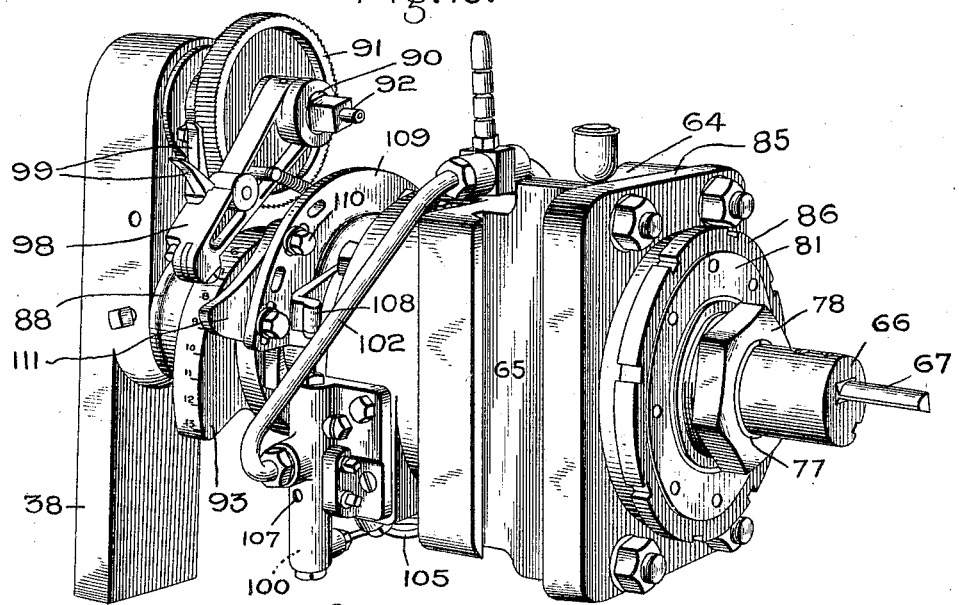

J. RIDDELL.
UNIVERSAL BUCKET CUTTING MACHINE.
APPLICATION FILED JUNE 27, 1903.
1,006,279.
Patented Oct. 17, 1911.
9 SHEETS—SHEET 1.
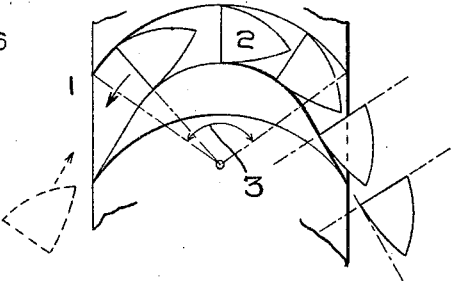
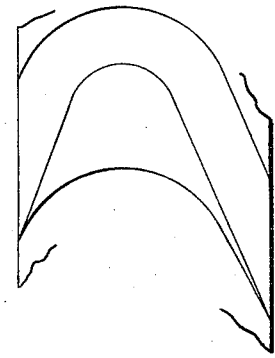
Witnesses:
Marcus L. Byng.
Alex. F. Macdonald.
Inventor:
John Riddell,
by Albert G. Davis Att'y.

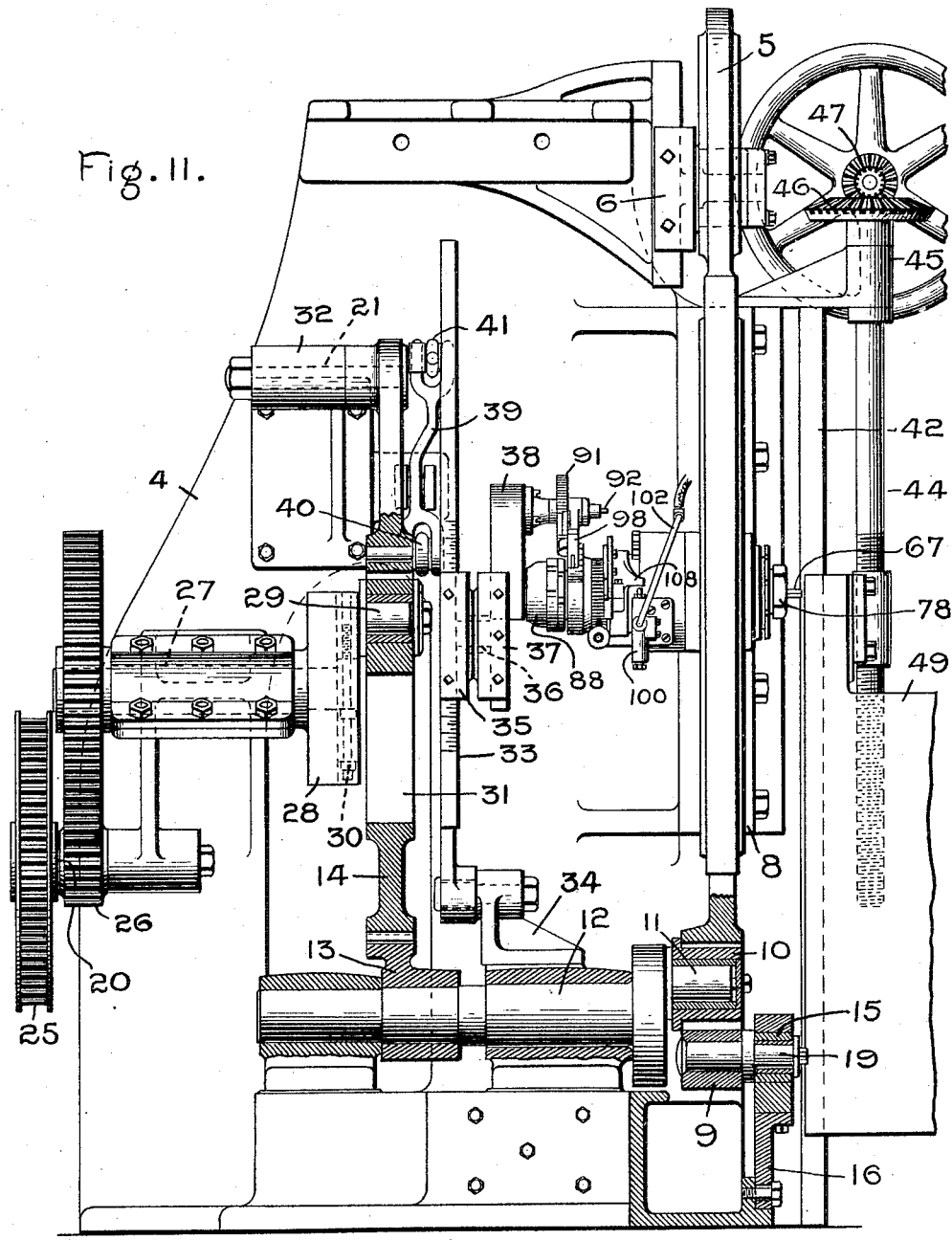

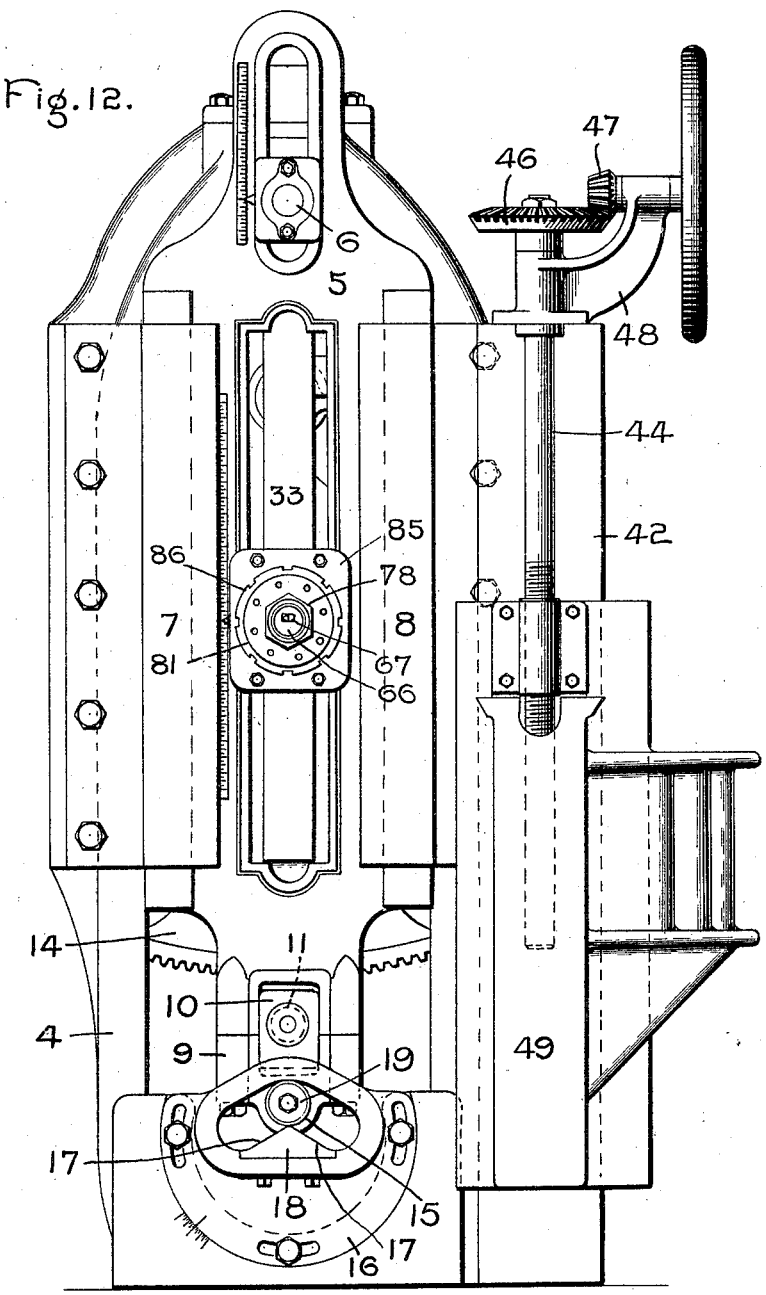

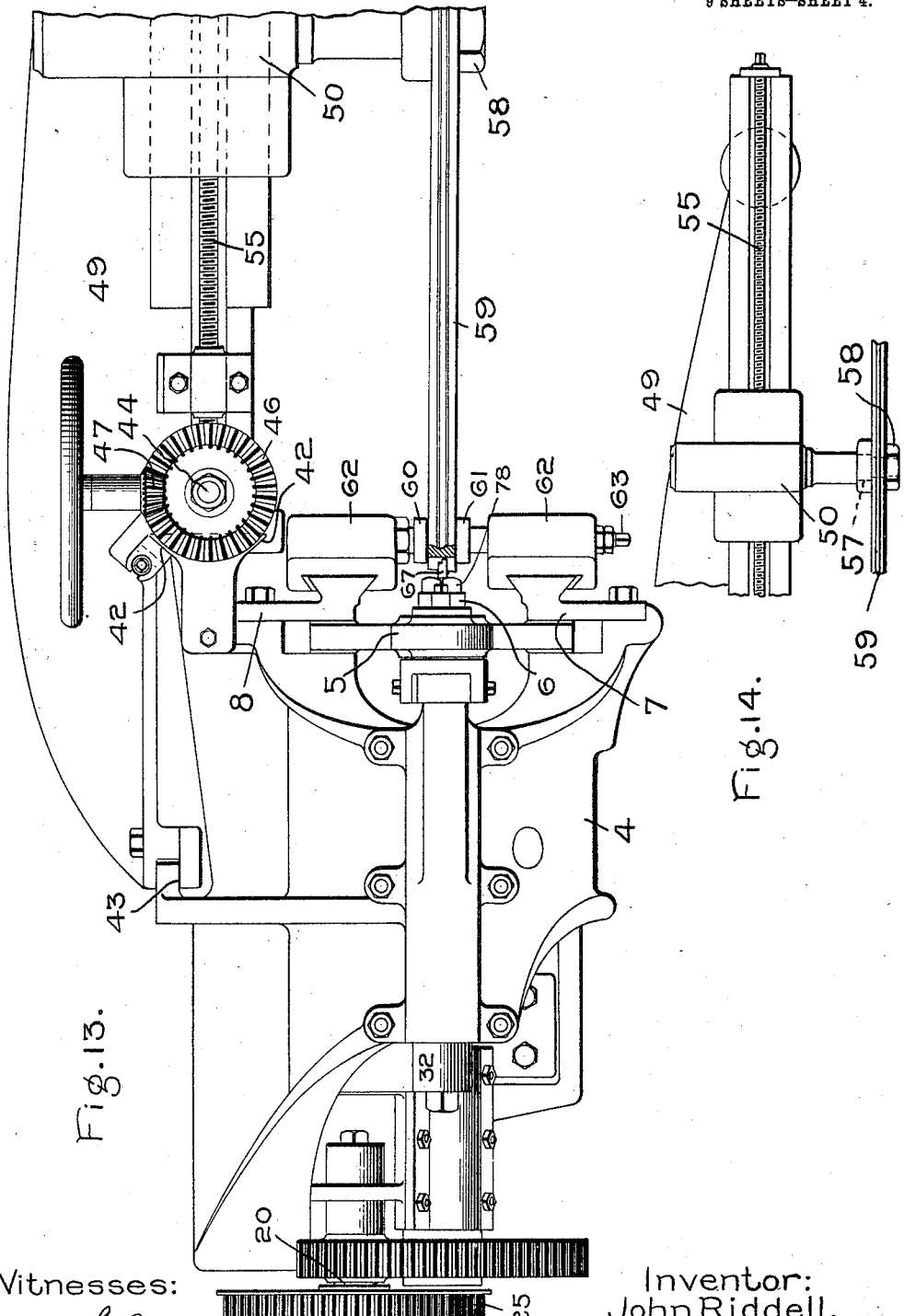

Witnesses:
Marcus L. Byng.
Alex. F. Macdonald.

Inventor:
John Riddell,
by Albert G. Davis
Att'y.

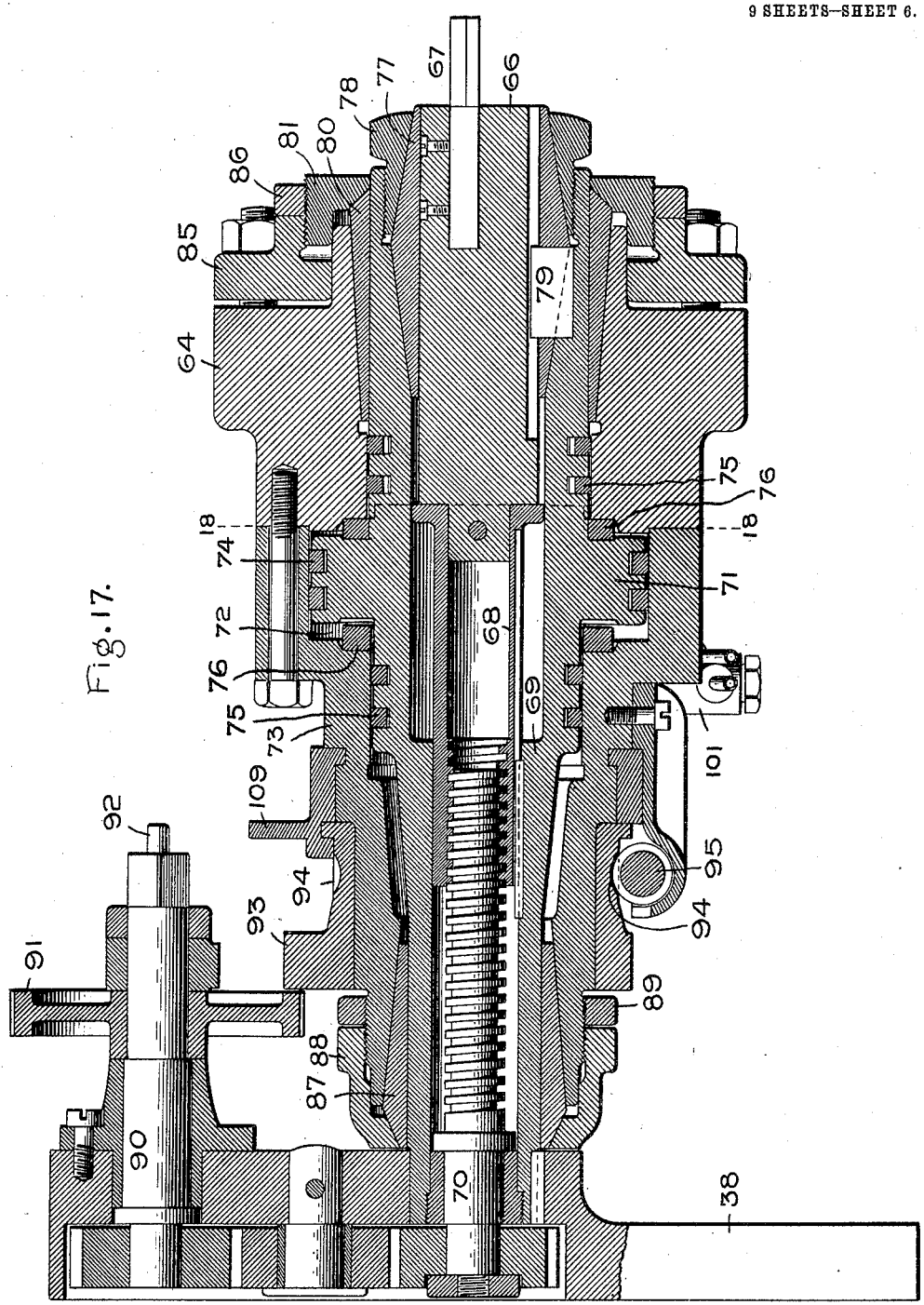

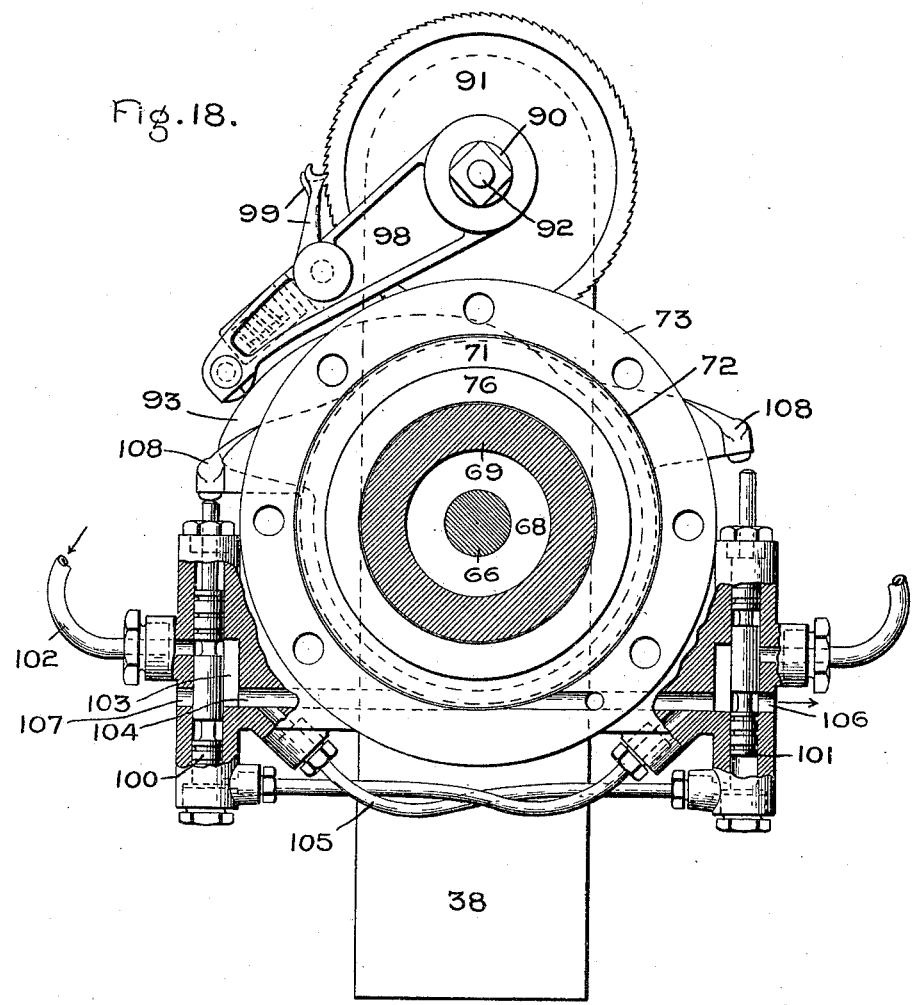

J. RIDDELL.
UNIVERSAL BUCKET CUTTING MACHINE.
APPLICATION FILED JUNE 27, 1903.
1,006,279.
Patented Oct. 17, 1911.
9 SHEETS—SHEET 8.
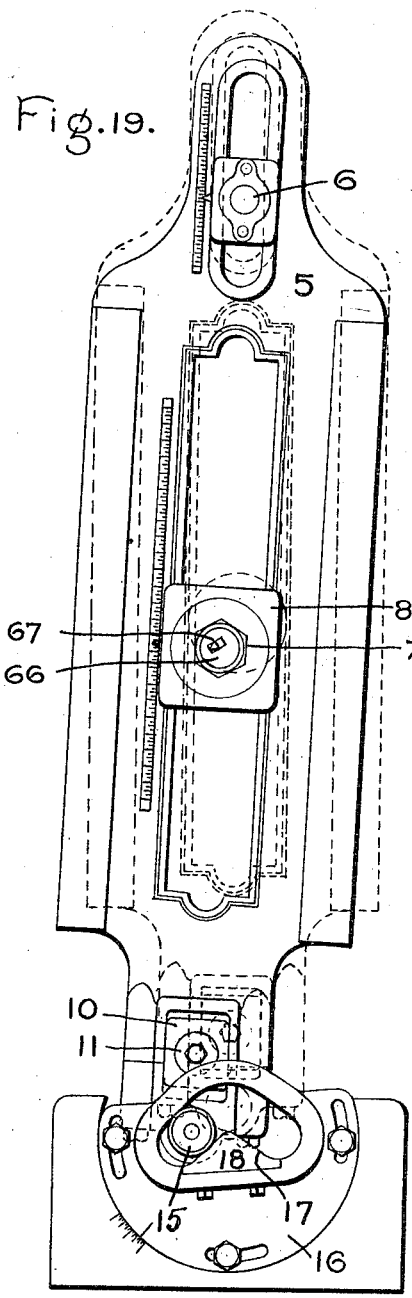
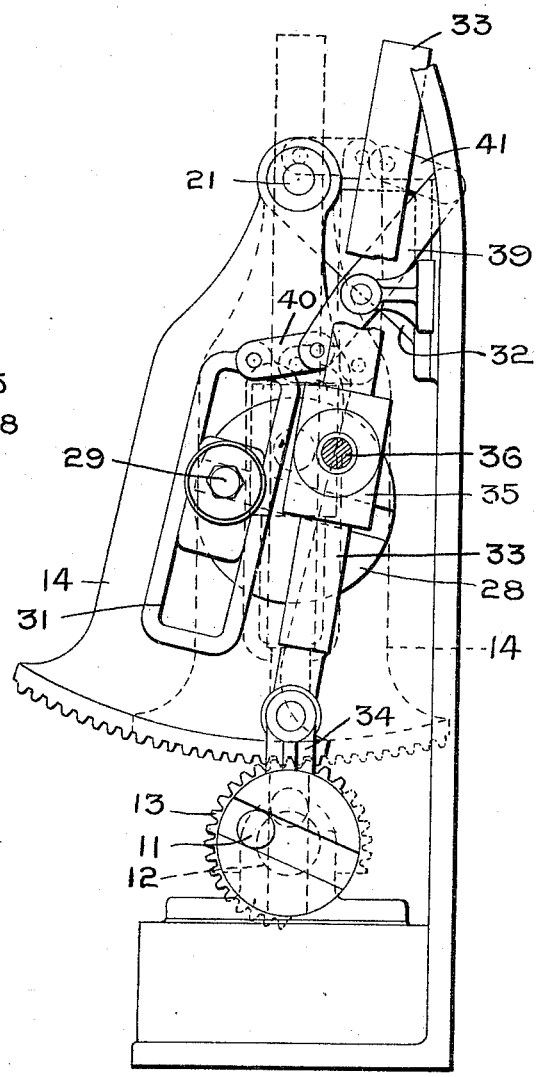
Witnesses:
Marcus L. Byng.
Alex. F. Macdonald.
Inventor:
John Riddell,
by Albert G. Davis
Att'y.

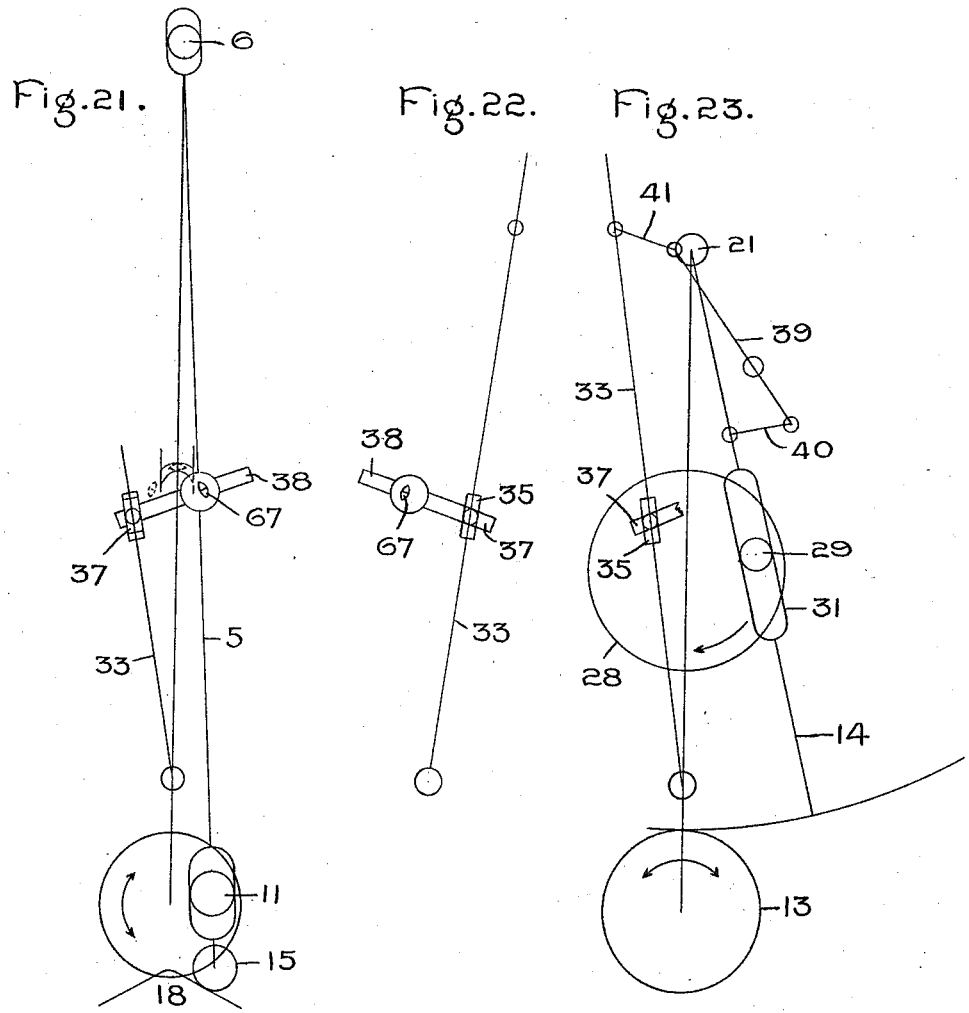

UNITED STATES PATENT OFFICE.

JOHN RIDDELL, OF SCHENECTADY, NEW YORK, ASSIGNOR TO GENERAL ELECTRIC COMPANY, A CORPORATION OF NEW YORK.

UNIVERSAL BUCKET-CUTTING MACHINE.

1,006,279. Specification of Letters Patent. Patented Oct. 17, 1911.

Application filed June 27, 1903. Serial No. 163,320.

*To all whom it may concern:*

Be it known that I, JOHN RIDDELL, a citizen of the United States, residing at Schenectady, county of Schenectady, State of New York, have invented certain new and useful Improvements in Universal Bucket-Cutting Machines, of which the following is a specification.

The present invention relates to machines for forming buckets or vanes for turbines, and more especially for those actuated by an elastic fluid such as steam, compressed air or gas, by cutting curved slots by successive cuts across the peripheral face of a disk, ring, or a segment thereof. These buckets, while they may be of a variety of shapes, commonly comprise a thick central portion located at or about the middle of the disk, ring or segment thereof which is being cut, the thickness being measured in a plane at right angles to a radius of the disk, and tapering side walls which terminate in sharpened edges at opposite sides of the disk. The passages formed between them are substantially U-shaped, the sides diverging more or less as the entering and leaving angles become flatter.

The object of the invention is to provide a machine which will reduce to a minimum the time required to cut turbine buckets, and further to provide a machine by means of which a great variety of bucket shapes can be produced with the least modification or change of the working parts or in their relative adjustment.

In carrying out my invention I dispense with the expensive cams heretofore used for actuating the cutting tool and employ a crank and link mechanism which can be easily and quickly adjusted to vary the size and form of the buckets, and the passages or slots between the buckets.

The tool-holder is supported by a frame or cutter bar which is capable of rocking and reciprocating movements. These movements take place simultaneously, hence the movement of the tool is due to a resultant of the two forces which move the frame, and the path of the tool can be varied by changing the application of the forces to the frame. The path of the tool through the work is generally one of varying radius, it being smallest at or about the middle of the work and gradually enlarging toward the sides. The tool forms the buckets, and hence the slots or passages between them, by successive cuts, and on the idle portion of its stroke the tool returns through said slot or passage. In this respect, as well as in others, my improved mechanism forms a radical departure from the prior existing bucket cutting machines wherein the tool is retracted on each idle stroke by an amount slightly exceeding the maximum depth of the bucket being cut, whether it be one inch or six. In addition to withdrawing the tool longitudinally so that it will clear the work, it is also moved laterally to bring it into a cutting position; it being understood that the tool passes through the work from one side to the other on the cutting stroke. With prior existing machines the idle portion of the tool stroke exceeds the active portion by from two to three times, but with my improved construction the tool starts back through the slot on its return stroke immediately after finishing the cut. In this way the idle and active strokes are practically of the same length, although the return stroke is made in a less interval of time.

The tool which I prefer to employ comprises a body portion which is longer than it is wide, when considered in the direction of the cut, and tapers from a central portion where the cutting edge is located to the front and rear.

In order to hold the cutting edge of the tool normal to the cut and thereby prevent it from dragging, a means is employed to rock the tool-holder about its axle as the tool passes through the work. The same means also preserves the proper relation of the tool and work as the former passes through the latter on its return stroke. An illustration of said means will be found in a rocking lever and guide block pivoted thereto, the latter engaging with and imparting a rocking movement to the tool-holder. Between the block and the holder is a lost-motion connection which compensates for the reciprocating movements of the guide frame that carries the tool-holder.

In order to separate the work and tool with respect to each other between cuts I employ a motive device, which is arranged to move the tool forward at the beginning of its cutting strokes and to retract it by a small fraction of an inch on its return stroke.

By this arrangement the edge of the tool is prevented from dragging on the work and also from being wedged by the chips. It will be found convenient for this purpose to use a piston and cylinder, working with compressed air, but other fluids can be employed if desired. This retracting of the tool to clear the work on the idle portion of the stroke and the subsequent advancing for the new cut must not be confused with the automatic feeding-devices, for they are entirely separate in their operation.

The tool and work are fed or advanced with respect to each other between successive cuts. The present embodiment of the invention shows for this purpose a screw-threaded spindle that is attached to the tool-holder. The spindle is advanced by gearing actuated by a split feed ratchet-and-pawl mechanism. The amount that the tool is advanced for each cut is determined by an adjustable cam which actuates the pawls. The cam is carefully graduated to indicate the feed in thousandths of an inch, so that the operator can see at a glance the rate of cutting. A considerable movement of the cam is necessary for a very small change in feed, hence the chance for error is virtually eliminated.

In order to make the structure compact and reduce the number of parts, the spindle which carries the support for the feeding pawls is provided with a projection which actuates first one and then the other admission valve for regulating the supply of fluid to the motor above referred to.

Figure 16:
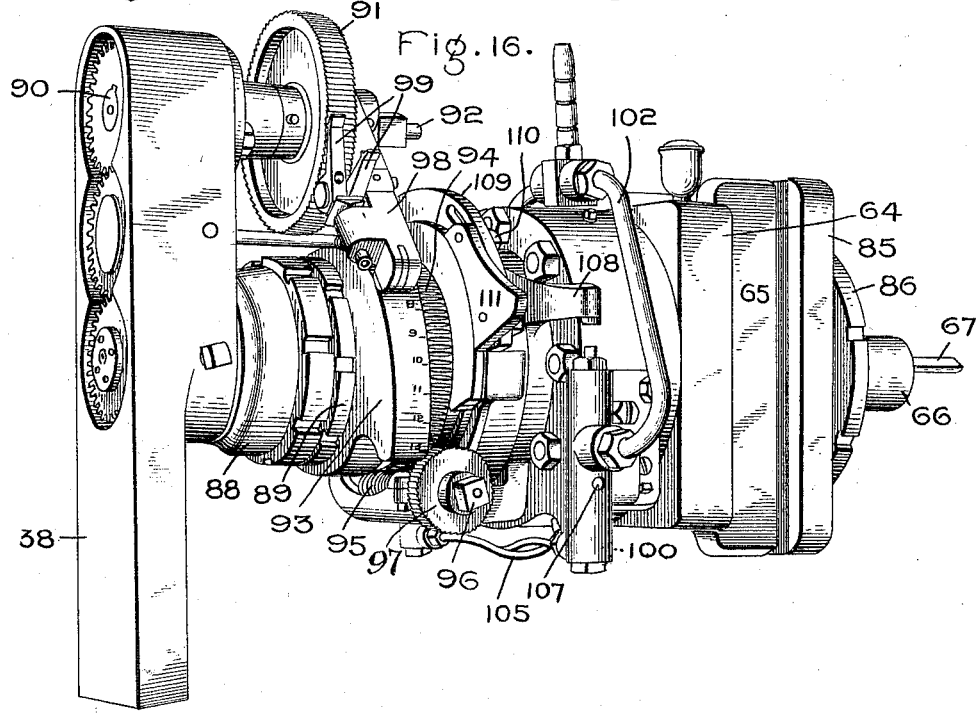

In the accompanying drawings, which illustrate one embodiment of my invention, Figure 1 is a diagrammatic view of a slot or passage formed between adjacent buckets, and the lower end of the tool is shown in the various positions which it occupies in forming said slot or passage; Figs. 2 to 10 inclusive illustrate different bucket shapes which can be cut with my improved machine; Fig. 11 is a side view of a bucket cutting machine with the side frame and certain of the other parts broken away; Fig. 12 is a front elevation of the same with a part of the work-holder removed; Fig. 13 is a plan view of the machine; Fig. 14 is a detail view of the work-holder; Fig. 15 is a perspective view of the head which carries the tool-holder; Fig. 16 is also a perspective view of the head showing the construction when viewed from a point at about right angles to that of Fig. 15; Fig. 17 is a longitudinal section of the head and tool-holder; Fig. 18 is a cross section taken on line 18 18 of Fig. 17; Figs. 19 and 20 are semi-diagrammatic views showing the parts in certain operative positions; and Figs. 21 to 23 are diagrammatic views showing the relation of the parts under different conditions of operation.

In order to obtain an understanding of the requirements of a bucket cutting machine attention is first directed to Fig. 1. 1 represents the blank or work which is being cut, and 2 the lower end of a tool, the cutting edge of which is represented by the straight line that extends from one curved wall to the other. Various positions of the tool on the cutting stroke are indicated by a succession of small figures representing the lower end of the tool. That portion of the slot included within the angle 3 has concentrically-curved side walls, and it should be noted that the tool swings around as it progresses through the slot, its cutting edge always coinciding with a radius struck from the scribing center of the bucket. Beyond the portion having concentric walls, and on each side thereof, the radius of the bucket increases. In the particular bucket under consideration the ends are straight and form tangents to the smaller circle. It is evident however that the tool moves in the path of a gradually decreasing radius from the right-hand edge of the blank until it strikes the concentric portion, and after passing through said portion it moves in the path of an increasing radius to the end of its stroke. In dotted lines is shown the tool after it has finished its cut and is about to start on its return stroke through the slot or passage, as is indicated by the dotted arrow.

From the foregoing it is evident that three forces must act on the tool or the work to produce the required shape of bucket. One force moves the tool and work relatively to each other and in the plane of the work; a second moves the tool to cut the work; and the third causes the tool-holder to maintain the tool normal to the cut.

Referring to Figs. 11 and 12 the means employed to produce and apply the first force will be described; 4 represents the framework of the machine, and mounted on the front thereof adjacent to the work is a frame or cutter bar 5 for carrying the tool-holder that is capable of reciprocating in a plane at right angles to that of the work, which in the present embodiment is a vertical one. It is also capable of being rocked in a plane at right angles to that of the work, and these two actions take place simultaneously.

The upper end of the rocking and reciprocating frame is provided with an adjustable pivot 6 which is arranged to be moved up and down on guides formed on the frame. The opposite sides of the frame 5 move in guides 7 and 8 which are bolted to the main framework of the machine. These guides are so arranged that they permit the frame to be rocked in a plane at right angles to that of the work and also to be reciprocated. The lower end of the frame is provided with a detachable cap 9 which contains the lower end of a slot, the latter receiving the block 10 which is carried by the crank pin 11 formed on the rock shaft 12. The rock shaft is mounted in suitable bearings that are carried by the base of the machine. Mounted on the shaft at a point between the bearings is a segmental pinion 13 which meshes with a segmental gear 14 that in turn is driven by the main driving shaft. Mounted in the lower end of the frame cap 9 is a spindle 19 which carries a roller 15. This roller is arranged to engage with a cam or other device 16 for imparting reciprocating motion to the frame 5. The cam is provided with two oppositely-extending inclined surfaces 17 which are so arranged that as the frame is rocked from side to side it is also reciprocated, due to the action of the crank pin 11 which is actuated by the rock shaft 12. The weight of the frame and its attached parts is supported by the roller 15.

The inclination of the surface 17 of the cam partially determines the shape of the buckets being cut. The steeper the inclinations the smaller will be the angles of the receiving and discharge ends of the bucket. Conversely the less these surfaces are inclined to each other the flatter will be the angles of the bucket. The formation of these surfaces also has a direct bearing on the formation of the ends of the buckets, that is to say, whether they will be straight and tangential or form curves which are extensions of the smaller curves. The inclined cam surfaces 17 are formed on a detachable hardened block 18 which is bolted to a suitable support. In changing from one bucket shape to another the block or cam 18 is removed and a new one substituted. The support which carries the cam has a cylindrical periphery that fits into a corresponding surface formed on the framework 4 of the machine. The wall of the support is provided with two or more slots through which extend adjusting and retaining bolts. In the position shown a line passing through the frame pivot 6, the crank pin 11 and the spindle 19, will also pass through the highest point on the cam 18 and through the center of the support. With the parts in this relation the center line of the buckets will coincide with a plane passing through the middle of the stock being cut, measured in a direction parallel to the axis of the work-holder. When it is desired to form an unsymmetrical bucket the cam is rotated to the left or right as is desired. When rotated to the right the cut will start at a point somewhat above the point at which the tool leaves the work; on the other hand, if the cam is rotated to the left so that the high point of the cam no longer coincides with a plane passing through the pivot and pins, the cut will begin at a point somewhat lower than the leaving point. In the first case mentioned a symmetrical bucket is formed, and in the second and third cases, unsymmetrical buckets.

20 represents the main driving shaft which is provided with a spur gear 25 which meshes with a smaller gear for the purpose of reducing the speed of the driving motor. The shaft is also provided with a pinion 26 which meshes with a spur gear, the latter being carried by a counter-shaft 27 which is carried in a suitable bearing supported by the framework of the machine. The end of the counter-shaft is provided with a disk 28 on which is mounted a crank pin 29. This pin is mounted in a groove which extends across the face of the disk and is adjustable toward and away from the center by the adjusting screw 30 shown in dotted lines. The object of this arrangement is to change the extent of movement of the rock shaft 12 and, consequently, the rocking movement of the frame 5 which carries the tool-holder. Surrounding the crank pin 29 is a guide block which moves in a slot 31 that is formed in the segmental gear 14. As the counter-shaft rotates it imparts an oscillating movement to the segmental gear. The arrangement of the crank pin and slot is such that the gear 14 moves most rapidly when the pin is in the upper end of the slot, and this is taken advantage of to give a quick return to the tool. When the pin is in the opposite end of the slot the tool is located in the center of the work and has its greatest rate of cutting. By this construction the tool starts and leaves the cut in a smooth and gradual manner. As shown the crank pin and the cutting tool are in the middle of the return stroke. The segmental gear is supported by a pivot 21 carried in a bracket 32, the latter being attached to the framework of the machine.

Situated between the segmental gear and the frame which carries the tool-holder is a rocking bar 33 which maintains the tool normal to the cut. This bar is provided with a pivot at its lower end which is mounted in a bracket 34, that is secured to the rock-shaft bearings or to any other suitable support. Mounted on the bar is an adjustable clamp 35 which carries a wrist pin 36, the latter being shown in dotted lines in Fig. 11 and in section in Fig. 20. Mounted on the wrist pin is a swinging guide 37 which engages with a head 38 that is rigidly attached to the tool-holder. As the bar 33 rocks back and forth it imparts a rocking motion to the head 38, and in this way the tool is rocked about the axis of the tool-holder and is maintained normal to the cut. The head 38 is free to slide back and forth in the swinging guide 37 to a limited extent, and in this manner a lost-motion connection is formed between the bar and the tool-holder. I have described what I have found to be a satisfactory means for rocking the tool-holder, but I do not wish to be understood as limiting myself to the precise arrangement shown, for it can be modified, without departing from the spirit of my invention.

The means for actuating the rocking bar will now be described: 39 represents a rocking lever which is pivoted to a suitable support formed on the framework of the machine. This lever is best shown in Figs. 11 and 20. The lower end of the lever is connected by a link 40 with the oscillating segmental gear 14, while the upper end is connected through a link 41 with the rocking bar 33. As the segmental gear oscillates it causes the bar to move back and forth, and in this manner rock the tool holder.

Referring to Figs. 11 to 14 inclusive, the work-holder will be described: 49 represents a horizontally-extending arm or frame which is provided with vertical finished surfaces, Fig. 13, which move on the guides 42 and 43 formed on the framework of the machine. These guides are for the purpose of directing the vertical movements of the work-holder. This adjustment is made necessary by reason of the fact that the machine is intended to cut disks, rings and segments thereof of different diameters, and in cutting such work the center of the supporting spindle is moved to a point where it coincides more or less closely with the axis of the tool-holder. In order to raise and lower the work-holder a shaft 44, Fig. 11, is provided which at its lower end is screwed into a nut on the frame or arm 49. The upper end of the shaft passes through a bearing 45 that is rigidly secured to the framework of the machine. On the extreme end of the shaft is a beveled gear 46 which meshes with a pinion 47; the latter is mounted on the end of a hand-wheel shaft and is supported by a bracket 48. Rotating the hand-wheel in one direction or the other causes the work-holder to be moved up or down, as the case may be. The upper surface of the frame or arm 49 is provided with a dove-tailed projection which acts as a guide for the sliding head 50 that supports the work-carrying spindle. The head is adjustable on the arm or frame in a longitudinal direction by means of the screw-threaded spindle 55, which passes through a nut that is attached to the head in any well known manner. The end of the spindle is squared to receive a handle for rotating it. The work is supported by a spindle 57 that is carried by the head, and a nut 58 is employed to secure the work in place.

In order to hold the work 59 in place during the operation of cutting, I provide two adjustable stops 60 and 61, Fig. 13. These stops are mounted on sliding heads 62 that are supported below the cutting tool by dove-tailed projections on the framework of the machine. In the present instance the projections are formed on the detachable plates 7 and 8, which also serve as guides for the rocking and reciprocating tool-carrying frame 5. By this arrangement the number of parts is reduced to a minimum and the structure as a whole is made simple and compact. The stop 60 is provided with a check-nut for retaining it in position, and is normally set in a given position and locked in place. The stop 61 is adjusted by means of a spindle having a squared end 63 to which a handle may be applied. In a normal operation of the machine the work is adjusted to the proper position and is then clamped in place between the stops 60 and 61. When it becomes necessary to advance from one slot to the next the stop 61 is released and the work turned, after which it is again clamped in place. In order to insure that the work is advanced by the proper amount, a notched index wheel (not shown) is provided and the pitch of the notches corresponds to that of the buckets.

Referring to Figs. 15 to 18 inclusive, the construction and arrangement of the tool-holder and the means for feeding the tool will be described: 64 represents a head which is clamped to the rocking and reciprocating frame 5. This head can be adjusted toward and away from the pivot 6 of the frame in order to vary the extent of its movement. The nearer the pivot the head is located the smaller will be its movement, other things being equal. The head is provided with vertically-extending bearing surfaces 65 which engage with corresponding surfaces on the frame. 66 represents the tool-holder and 67 the tool for forming the buckets. Secured to the end of the tool-holder is a screw-threaded sleeve 68 which is splined to a barrel 69 that surrounds the holder. Mounted in the end of the sleeve is a screw-threaded spindle 70 by means of which the tool and the holder are automatically fed forward as the cutting progresses. The barrel 69 surrounds and supports the tool-holder and spindle, and formed between the barrel and the head 64 is a fluid-pressure motor. In the present embodiment of my invention the barrel is provided with a piston 71 which reciprocates in the cylinder 72 that is formed in the cylindrical casing or extension 73 that is bolted to the head 64. The periphery of the piston is provided with packing rings 74, and the barrel is provided with packing rings 75, located on opposite sides of the piston. Situated adjacent to opposite sides of the piston and arranged to limit the extent of its movements are rings 76. These rings also take the force of the blow at the end of each piston stroke. The tool-holder is secured in place within the barrel by a bushing 77 that is provided with a double beveled surface, and engaging with one of said surfaces is an adjusting nut 78. The holder is prevented from rotating independently of the barrel by means of a spline 79 which passes through the bushing 77 into the barrel. Between the barrel and the head 64 is a bushing 80, which is also provided with a double beveled surface. One of these surfaces engages with the head, while the other engages with a screw-threaded nut 81. The nut is provided with an external screw thread which enters the flange 85 that forms a part of the head and which clamps it to the rocking and reciprocating frame 5. The adjusting nut 81 is secured against accidental rotation by the check-nut 86. The left-hand end of the barrel is provided with a bushing 87 which has a double beveled surface. One of these surfaces engages with the cylindrical casing 73, and the other with the adjusting nut 88, which surrounds the casing. The nut is retained in place by a check-nut 89. Secured to the end of the barrel by a key or otherwise is the head 38 which is employed to oscillate the tool-holder to maintain the tool normal to the cut. This head is chambered out to receive the gears which transmit motion between the spindles 90 and 70. Spindle 90 is located near the outer end of the head and is provided with a ratchet-wheel 91. The spindle is extended somewhat beyond the ratchet-wheel and is provided with a squared end, to which a handle may be attached for adjusting the tool-holder by hand, and also with a projection 92, that is employed to actuate valves for controlling the fluid motor. Sleeved on the casing 73 is a cam 93 that is provided with a sleeve-like extension on which is cut a worm gear 94, and meshing therewith is a worm 95. The worm is provided with a spindle having a squared end 96 (Fig. 16) to which a handle may be applied. It is also provided with a small hand-wheel 97 for manually adjusting the position of the cam 93. This cam is free to rotate around the casing or support 73 under the action of the worm 95, and its outer surface is graduated to indicate the proper feed for the tool.

Sleeved on the spindle 90 that is carried by the head 38 is an arm 98, Figs. 15, 16, 17 and 18, which at its outer end engages with the cam 93. It is also provided with a pair of pawls 99, which engage with the ratchet wheel 91 and form a split-feed device. In the perspective views, Figs. 15 and 16, one of these pawls is shown out of engagement with the ratchet, but in the operation of the machine they are both in constant engagement therewith. The cam 93 is so formed that its diameter increases very slowly, hence the liability of over-adjustment on the part of the operator is reduced to a minimum. On the periphery of the cam will be noticed a number of marks some of which are numbered. When a number coincides with the index on the end of the arm 98 the feed in fractions of an inch can be read directly, each of the numbers representing a change in feed of one one-thousandth of an inch. Each time the head is moved in a direction to cause the roller on the arm 98 to ride up the inclined face of the cam 93, the pawls advance the ratchet wheel 91 a certain amount. This motion is transmitted to the tool spindle 70 by the gearing located within the head 38. In this manner a step-by-step feed is imparted to the tool.

Bolted to the outside of the casing are two piston valves 100 and 101 which are employed to control the action of the fluid-pressure motor previously referred to. This motor is employed to retract the tool at the end of the cut to prevent its cutting edge from being dragged across the work on the return stroke, and also to prevent chips from being caught between the tool and the stock and bending or breaking the former; it being remembered that the tool passes through the slot on its return stroke. The motor is also so arranged that it will automatically advance the tool to the proper position before the beginning of the stroke. The action of this motor is entirely separate from the feed mechanism and is operative whether the cut has just been started or is six inches deep.

Referring to Fig. 18, the relation of the valve mechanism to the motor is shown, and since the construction of both of the valves is similar, a description of one of them will be sufficient. Fluid under pressure enters the valve chamber from the pipe 102. I may employ any suitable fluid for actuating the motor, but I have found compressed air to be the most satisfactory. The piston valve is balanced and fluid entering passes the portion of reduced size and enters the passage 103 which in turn communicates with the passage 104 that leads to the rear of the motor piston. This passage is also in communication with the pipe 105 that admits fluid to the cylinder space directly under the piston valve 101 on the opposite side. The object of this arrangement is to raise the latter valve and uncover the exhaust port 106. When the piston valve 100 is depressed the exhaust port 107 is closed, and when raised it is open. With the parts in the position shown the piston of the motor occupies the position shown in Fig. 17, that is to say, the tool and its holder are in the extreme forward position and ready to cut. The valves are operated by the arms 108 through a suitable lost-motion connection or device. It is also to be noticed that there is a certain amount of lost motion between the arms and the ends of the valve stems. The arrangement of the valve-actuating mechanism is best illustrated in Figs. 15 and 16. Mounted on the casing 73 is a flanged ring 109, which flange is slotted at points near the periphery, and passing through the slots are retaining bolts 110 that adjustably secure the ring and lugs 111. The arms 108 are secured to or formed integral with the flanged ring 109. The projection 92, Figs. 15 and 16 on the spindle carrying the feeding ratchet is arranged to strike the lug 111 on one side of the axis of the head on the forward stroke, and to strike the opposite lug on the return portion of the stroke. As these lugs are alternately depressed they move the motor-controlling valves in the proper manner. It will be seen that the projection 92 is idle for the larger portion of its movement, and in this manner a lost-motion connection is formed between the head 38 and the motor-controlling valves.

In Figs. 19 and 20 I have shown in a more or less diagrammatic way the relation which the parts bear to each other while in operation. In full lines the rocking and reciprocating frame 5 is shown in the extreme left-hand position as viewed from the front, and in dotted lines is shown the position of the frame when the roller 15 is at the top of the cam block 18, which represents the upper extremity of the movement of the frame. The tool 67 is shown in the position that it occupies just as it is about to enter the work. As the roller 15 gradually ascends the inclined surface of the cam the frame rises and the tool is rocked about the axis of the tool-holder until its cutting face is parallel with a straight line connecting the pivot 6 of the frame and the crank pin 11. In other words, the tool is rocked slightly to maintain it normal to the cut. Continued motion of the roller down the inclined surface of the cam lowers the frame, and the tool is rocked as this movement takes place.

In Fig. 20 is shown the position which the segmental gear 14 and the rocking bar 33 occupy when the frame is in the position shown in Fig. 19. This figure shows at 29 the end of the crank pin which oscillates the segmental gear, and the lever 39 and links 40 and 41 for actuating the rocking bar 33. In dotted lines is shown the relative positions of the parts when the rocking and reciprocating frame 5 is in the central or intermediate position, as shown in dotted lines in Fig. 19.

In Fig. 21 is shown diagrammatically the position of the frame 5 and the tool-holder at the end of its stroke. The rocking bar 33 is on the left-hand side of the center, and in assuming this position it has caused the tool 67 to be rocked from the position shown in dotted lines to that shown in full lines.

Fig. 22 shows the rocking bar 33 on the right of the center, which is the position for starting the cutting stroke.

Fig. 23 shows the relation which the segmental gear 14 bears to the remainder of the apparatus. The linkage between the gear and the rocking bar 33 is also clearly shown. The tool is at or near the end of its stroke and ready to return through the slot.

Referring to Fig. 11, it will be seen that the rocking bar is provided with scale marks indicating certain adjustments for the adjustable clamp that carries the wrist pin 36 and rocks the tool-holder.

In Fig. 12 it will be seen that opposite the pivot 6, the rocking and reciprocating frame is provided with scale marks. Mounted on the block carried by the pivot is a pointer which indicates the relative adjustment of the frame and pivot. Opposite the tool-holder the frame is again provided with scale marks, and a pointer carried by the holder moves over them. The portion of the base of the machine adjacent to the cam 16 is also provided with scale marks, and on the cam is a datum point to determine the angular displacement of the cam. Having determined the shape of the bucket to be cut, the various parts of the machine are adjusted to form it. Careful record is then made of the various scale markings. This method is carried out for each new form of bucket and the results tabulated, so that in the future even a relatively unskilled person can adjust the machine for any form of bucket which it is capable of making.

Referring to Figs. 2 to 10 inclusive, I have shown some of the various shapes which may be formed with my improved machine.

Fig. 2 shows a bucket wherein the center coincides with the central plane of the work, the latter being indicated by a broken line. The slot between that portion of the bucket represented by the angle 115 is provided with parallel and concentric side walls. The extreme ends of the buckets are provided with straight walls which are tangential to the curved walls. This view as well as those following is made looking into the slot from the tool side of the machine.

In Fig. 3 is shown a bucket whose center is somewhat to the left of the center line of the work, and in Fig. 4 is shown a similar bucket whose center is somewhat to the right of the center of the work. This form of bucket is obtained by shifting the work laterally on its supporting spindle.

In Fig. 5 is shown a bucket that is formed by two sets of cuts; the first set forming the bucket as shown in full lines, and the second set forming the portion of the bucket illustrated by the dotted line 116. In other words, the slot between buckets instead of having concentric walls is now provided with non-concentric walls. This arrangement increases the cross-sectional area of the passage or slot from one side of the work to the other. In forming this bucket the work is moved inward slightly toward the work-support and also lowered before making the second set of cuts.

In Fig. 6 I have shown a slightly different form of bucket wherein an enlargement of the slot or passage between the buckets is obtained, but in a slightly different manner. In this case the second cut is taken from that portion of the bucket of smaller radius, as is indicated by the dotted line 117.

In both Figs. 5 and 6 the second cuts have been made on the right-hand side of the center of the work.

In Figs. 7 and 8 I have shown buckets similar in general construction to those of Figs. 5 and 6, the exception being that the second cuts, as represented by the dotted lines 118 and 119, have been taken from the sides of the buckets on the left of the center of the blank instead of on the right.

In Fig. 9 I have shown a slightly different form of bucket from those previously described. In this bucket the entering and leaving angles are considerably flatter. Buckets of this character are located in turbines where the velocity of the fluid stream is less than where the buckets of the character shown in Figs. 2 to 8 are employed. In order to make buckets of this character it is necessary to either remove the cam block 18 and substitute a new one with surfaces having the proper inclination, or to remove the entire structure 16 and substitute a new one with the properly formed cam surface or surfaces. In either event it is only a small matter to make the change, and requires but a very brief interval of time.

In Fig. 10 is shown a type of bucket sometimes used as a stationary or intermediate between wheel or rotary buckets. The characteristic difference between it and those previously described is that the tail, or right-hand end, is elongated so that the fluid flows between parallel side walls for some considerable distance and is thereby given a definite direction. In effect the bucket is rotated about its scribing center until the tail is considerably below the entering end.

In accordance with the provisions of the patent statutes, I have described the principle of operation of my invention together with the apparatus which I now consider to represent the best embodiment thereof; but I desire to have it understood that the apparatus shown is only illustrative and that the invention can be carried out by other means.

What I claim as new and desire to secure by Letters Patent of the United States, is—

1. In a machine for cutting curved slots across the peripheral face of a disk, ring or a segment thereof by successive cuts, the combination of a tool-holder, a supporting frame therefor which has a combined rocking and reciprocating motion in a plane transverse to the slot being cut, a work-holder, a means for rocking and reciprocating the frame which, on its forward stroke, causes the tool to cut the work, and on its return or idle stroke to pass through the cut, and mechanism actuated by said means for maintaining the tool normal to the cut.

2. In a machine for cutting curved slots across the peripheral face of a disk, ring or a segment thereof by successive cuts, the combination of a tool-holder, a frame which carries the tool-holder and has a combined rocking and reciprocating motion, a driving means which simultaneously imparts both motions to the frame, guides for confining the movements of the frame to a plane transverse to the slot being cut and at right angles to that of the work, a work-holder which presents the work to the tool, the tool and work being so related that the tool passes through the slot cut in the work on its idle stroke, and mechanism actuated by said means for feeding the tool holder and the work holder relative to each other.

3. In a machine for cutting curved slots across the peripheral face of a disk, ring or a segment thereof, the combination of a work-holder, a tool-holder, means for feeding them toward each other as the cutting progresses, a frame which supports the tool-holder, guiding means for the frame, means for simultaneously rocking and reciprocating the frame in a plane at right angles to the direction of the feed to impart a cutting movement to the tool, and means for causing one of the holders to advance and recede at different portions of said movement.

4. In a machine for cutting slots across the peripheral face of a disk, ring or a segment thereof, the combination of a work holder, a tool holder, mechanism for feeding them toward each other as the cutting progresses, a frame which supports the tool holder, means for rocking the frame, a device for reciprocating the frame longitudinally, the said means and device coöperating to oscillate the tool in a curved path at right angles to the direction of the feed across the peripheral face of the work to cut a slot therein having curved sides or walls, and means for causing the tool-holder to advance and recede at different portions of said path.

5. In a machine for cutting slots having curved sides across the peripheral face of a disk, ring or a segment thereof, the combination of a work holder, a tool holder movable across said face, mechanism for feeding said holders toward each other as the cutting progresses, a pivoted frame which supports the tool holder, means for rocking the frame and actuating said feeding mechanism, a device for imparting a reciprocating movement to the frame, said means and device coöperating to move the tool in a path at right angles to the direction of the feed having the desired curvature for the slot, and a driving mechanism for said rocking means which coöperates with said device to reciprocate the frame during each cutting stroke.

6. In a machine for cutting curved slots across the peripheral face of a disk, ring or a segment thereof, the combination of a work-holder, a cutting tool, a tool-holder, a frame which carries the tool-holder intermediate its ends and has a slot adjacent its upper end, a pivot engaging said slot, means for swinging the frame about the pivot, a cam having a double inclined surface which engages the lower end of the frame and reciprocates the frame relatively to the pivot as it swings, guides for confining the movements of the frame to a given plane, and mechanism actuated by said means for feeding the tool in a direction at right angles to said plane.

7. In a machine for cutting curved slots across the peripheral face of a disk, ring or segment thereof, the combination of a work-holder, a tool-holder, a frame which carries the tool-holder intermediate its ends and is provided with slots adjacent each end, a pivot engaging the slot in the upper end of the frame, mechanism for swinging the frame about the pivot comprising a pin engaging the slot in the lower end of the frame and means for oscillating said pin, a roll mounted on the lower end of the frame, and a detachable cam having double inclined surfaces which engages the roll and reciprocates the frame relative to the pivot as the frame swings.

8. In a machine for cutting curved slots across the peripheral face of a disk, ring or a segment thereof, the combination of a work-holder, a tool-holder movable across said face, a frame which supports the tool-holder, a pivot for the frame, a means for rocking the frame, a cam for imparting longitudinal movement to the frame, and a means for adjusting said cam relative to the pivot so that the center of the slots can be shifted toward or away from one side of the work.

9. In a machine for cutting curved slots across the peripheral face of a disk, ring or a segment thereof, the combination of a work holder, a rocking and reciprocating frame, a pivot for the frame, means for rocking and reciprocating the frame in relation to the pivot, a tool holder which is adjustably secured to the frame and is moved by said means in a curved path across the face of the work, and a device actuated by said means for holding the tool normal to its cut.

10. In a machine for cutting curved slots across the peripheral face of a disk, ring or segment thereof, the combination of a work-holder, a frame, an adjustable pivot for the upper end of the frame, means connected to the lower end of the frame for rocking it about its pivot, a cam engaging the lower end of the frame for reciprocating it longitudinally during its rocking movement, a tool-holder which is adjustably attached to the frame at a point between the pivot and said means and is moved in a curved path across the face of said disk, ring or segment, and means for adjusting the cam relative to the pivot to vary the shape of said path.

11. In a machine for cutting curved slots across the peripheral face of a disk, ring or a segment thereof, the combination of a work-holder, a tool-holder, means for feeding the tool-holder toward the work-holder as the cutting progresses, a frame which supports the tool-holder and is mounted for movement in a plane at right angles to the direction of the feed, a shaft, means actuated by the shaft for rocking the frame in one direction for each successive cutting stroke and in the opposite direction for each successive idle stroke of the tool, means for reciprocating the frame longitudinally at each stroke, mechanism for retracting the tool-holder during the idle stroke, and means for driving the shaft.

12. In a machine for cutting curved slots across the peripheral face of a disk, ring or a segment thereof, the combination of a work-holder, a tool-holder movable across said face, a frame on which the tool-holder is rotatably mounted, a rock-shaft for rocking the frame, means for reciprocating said frame at each stroke, gearing for driving the shaft, and means intermediate the gearing and said holder for turning it to keep the tool normal to the cut.

13. In a machine for cutting curved slots across the peripheral face of a disk, ring or a segment thereof, the combination of a work-holder, a tool-holder, a frame on which the tool-holder is rotatably mounted, mechanism for rocking the frame, a device for reciprocating said frame during each rocking stroke, and means actuated by said mechanism for turning the tool-holder on the frame to keep the tool normal to the cut said means including a lost motion connection.

14. In a machine for cutting curved slots across the peripheral face of a disk, ring or a segment thereof, the combination of a work-holder, a tool-holder movable across said face, a pivoted frame which supports the tool-holder and moves it across the face of the work, a rock-shaft, an eccentric device driven by the rock-shaft, means connecting said device and the frame for moving the latter about its pivot, a cam for reciprocating the frame, gearing for driving the rock-shaft, a main driving shaft, and an adjustable connection between the main shaft and said gearing for varying the extent of the movement of the frame.

15. In a machine for cutting curved slots across the peripheral face of a disk, ring or a segment thereof, the combination of a work-holder, a movable frame, a tool-holder which is supported by the frame, a means for rocking and reciprocating the frame, a driving shaft, a driving connection between the shaft and said means, a rocking bar, a means actuated by the driving shaft for moving the bar, and a connection between the bar and the tool-holder for holding the tool normal to the cut.

16. In a machine for cutting curved slots across the peripheral face of a disk, ring or a segment thereof, the combination of a work-holder, a movable frame, a tool-holder which is supported by the frame, a means for rocking and reciprocating the frame, a driving shaft, a driving connection between the shaft and said means, a rocking bar, a wrist-pin adjustably secured to the bar, a guide mounted thereon, a sliding block which moves in the guide and is attached to the tool-holder, and a driving connection between the driving shaft and the bar.

17. In a machine for cutting curved slots across the peripheral face of a disk, ring or a segment thereof, the combination of a work-holder, a movable frame, a tool-holder which is supported by the frame, a means for rocking and reciprocating the frame, a driving shaft, an oscillating gear for moving said means, a pivoted bar for maintaining the tool normal to the cut, and a linkage for transmitting motion from the shaft to the bar.

18. In a machine for cutting curved slots across the peripheral face of a disk, ring or a segment thereof, the combination of a work-holder, a movable frame, a tool-holder which is supported by the frame, a means for rocking and reciprocating the frame, a main or driving shaft, a gear for actuating said means, an adjustable driving connection between the main shaft and the gear, a pivoted bar, a linkage between the gear and the bar, and a connection between the bar and the tool-holder for holding the tool normal to the cut.

19. In a machine for cutting curved slots across the peripheral face of a disk, ring or a segment thereof, the combination of a frame-work, a frame mounted thereon for rocking and reciprocating movement, a tool-holder mounted on the frame, a work-holder, a driving mechanism located back of the frame for moving it, a rocking bar situated between the mechanism and the frame, and a connection between the bar and the tool-holder for holding the tool normal to the cut on the forward stroke and causing it to pass freely through the slot on the return stroke.

20. In a machine for cutting curved slots across the peripheral face of a disk, ring or a segment thereof, the combination of a work-holder, a tool, a tool-holder, a pivot, a frame for the tool-holder which has a combined rocking and reciprocating movement about said pivot and moves the tool in a curved path across the face of the work, guides for holding the frame in a plane at right angles to the work, an eccentric device for rocking the frame during each cut made by the tool, means for actuating said device, a cam for simultaneously reciprocating the frame, means for feeding the tool and work relative to each other as the cutting progresses in a direction at right angles to said plane, and a device controlled by said feeding means for relatively advancing and receding the tool and the work at different portions of said path.

21. In a machine for cutting curved slots across the peripheral face of a disk, ring or a segment thereof, the combination of a work-holder, a tool-holder, a frame carrying the tool-holder which has a combined rocking and reciprocating motion, guides for the frame, a pivot for the frame, a crank-pin for rocking the frame, a cam for reciprocating the frame, a shaft for actuating the pin, a segmental gear which drives the shaft, a main shaft, and an adjustable connection between the main shaft and the gear.

22. In a bucket cutting machine, the combination of a tool-holder, a support therefor, means for oscillating the tool back and forth through the work, a means for feeding the tool, and a motor for retracting the tool on its return or idle stroke through the work and advancing it for engagement with the work on its cutting stroke.

23. In a bucket cutting machine, the combination of a tool-holder, a support therefor, means for oscillating the tool back and forth through the work, a means for feeding the tool, a fluid-pressure motor for retracting the tool on its return stroke through the slot and advancing it for engagement with the work on its cutting stroke, and a valve-mechanism for automatically controlling the action of the motor.

24. In a bucket cutting machine, the combination of a tool-holder, a barrel in which the holder is located, a head for supporting the barrel, a fluid-pressure motor formed between the barrel and the head for retracting and advancing the tool-holder, and a valve-mechanism for controlling the motor.

25. In a bucket cutting machine, the combination of a tool-holder, a feed-spindle attached thereto, a barrel which incloses the holder and spindle, a head which is attached to the barrel for oscillating it about its axis, a feed-mechanism for the spindle, and an automatic means for retracting and advancing the tool-holder independently of the feed-mechanism.

26. In a bucket-cutting machine, the combination of a tool-holder, a tool-feeding spindle movable with the holder, a driving means for rocking the holder and feed spindle, a ratchet and pawl for rotating the spindle step-by-step to feed the tool, and an adjustable cam which is also moved by the driving means and engages the pawl to vary its effect on the ratchet to change the feed.

27. In a bucket cutting machine, the combination of a tool-holder, a feed-spindle therefor, a barrel which incloses the holder, a head for oscillating the tool-holder, a motor for retracting and advancing the tool-holder during its idle stroke, and means actuated by the head for controlling the motor.

28. In a bucket cutting machine, the combination of a tool-holder, a feed-spindle therefor, a barrel which incloses the holder and feed-spindle, a head that is attached to the barrel for oscillating the holder, a support for the barrel, and a fluid-pressure motor for moving the barrel, holder and head on the idle stroke of the tool.

29. In a bucket-cutting machine, the combination of a tool-holder, a support for the holder, a feed-mechanism for the tool-holder, means for moving the feeding mechanism and the support with respect to each other, a cam mounted on the support which engages and actuates the feed-mechanism as the cutting progresses, a means for adjusting the position of the cam on the support to vary the amount of feed of the cutting tool, and a device controlled by the relative movement of the feed mechanism and the support which withdraws the tool from the work on the idle stroke without disturbing the position of the cam.

30. In a bucket cutting machine, the combination of a tool-holder, a head which is attached thereto for oscillating it, a fluid-pressure motor for advancing and retracting the holder, valves situated on opposite sides of the holder for controlling the motor, and means actuated by the head for operating the valves.

31. In a bucket cutting machine, the combination of a tool-holder, a head which is attached thereto for oscillating it, a fluid-pressure motor for advancing and retracting the holder, valves situated on opposite sides of the holder for controlling the motor, and means including a lost-motion device actuated by the head for operating the valves.

32. In a bucket cutting machine, the combination of a tool-holder, a head which is attached thereto for oscillating it, a fluid-pressure motor for advancing and retracting the holder, valves situated on opposite sides of the holder for controlling the motor, adjustable arms for operating the valves, and means actuated by the head for moving the arms.

33. In a bucket cutting machine, the combination of a tool-holder, a head which is attached thereto for oscillating it, a fluid-pressure motor for advancing and retracting the holder, double-acting valves for admitting and cutting off the supply of fluid to the motor, the valves being located on opposite sides of the holder, and means acting alternately on the valves at the beginning and end of each cutting stroke.

34. In a bucket cutting machine, the combination of a tool-holder, a support therefor, means coöperating to give the holder and its support an oscillatory motion to cause the tool to travel back and forth through the work, a feed mechanism for the tool which is actuated by said means, a motor acting on the holder independently of the feed mechanism to move the tool longitudinally and out of engagement with the work on the return stroke and into engagement therewith on the cutting stroke, and regulating means for the motor which are actuated by said oscillating means.

35. In a bucket cutting machine, the combination of a tool-holder, an inclosing barrel therefor, a head which is secured to the barrel for oscillating it, and is provided with guide surfaces, a device engaging said surfaces for moving the head, a feed-screw or spindle for the holder, gearing for actuating it which is carried by the head, a support for the holder and barrel, and a means on the support for actuating the gearing.

36. In a bucket cutting machine, the combination of a work-holder, a tool-holder, a pivoted frame on which the tool-holder is rotatably mounted, guides for the frame, mechanism for rocking and reciprocating the frame during each stroke of the tool in a plane transverse to the bucket being cut, and means actuated by said mechanism for turning the tool-holder to keep the tool normal to the cut.

37. In a bucket cutting machine, the combination of a framework, a cutter bar having slots at its upper and lower ends, a pivot on the framework which engages the upper slot, a tool-holder rotatably mounted on the bar intermediate its ends, a roll mounted on the bar adjacent the lower slot, a cam on the framework with which the roll engages, a pin which engages the lower slot, a crank to which the pin is attached, means for oscillating the crank to cause said pin and cam to rock and reciprocate the bar, a device actuated by said means for turning the holder to keep the tool normal to the cut, and means actuated by said device for feeding the tool and the work relative to each other.

38. In a bucket cutting machine, the combination of a tool and its holder, a fluid-pressure motor for moving the tool longitudinally, valves situated on opposite sides of the tool for controlling the motor, passages connecting the valves so that the active valve controls the other, a rocking and reciprocating frame to which the holder and motor are secured, and means for rocking and reciprocating the frame for each full stroke of the motor.

39. In a bucket cutting machine, the combination of a tool and its holder, a fluid-pressure motor for moving the tool longitudinally, valves situated on opposite sides of the tool for controlling the motor, a means for actuating the valves successively, a passage under the control of the valve being actuated for conveying fluid to the opposite valve, a frame to which the holder and motor are attached, and means acting on the frame to cause the tool-holder to be given an oscillatory motion.

40. In a machine of the character described, the combination of a work-holder, a support for the tool-holder, a cam and a crank which coöperate to move the support and cause the tool to enter the work and follow a substantially U-shaped path both on the cutting and idle strokes, a driving shaft for the crank, feed mechanism for the tool operated by the movements of the support, and means controlled by the movements of said support for retracting the tool on the idle stroke so that the cutting edge will not drag on the work as it passes through the slot.

41. In a machine for cutting slots by successive cuts, the combination of a work-holder, a tool-holder, a frame which carries the tool-holder, means acting on the frame to impart an oscillatory motion to the tool, a device moving with the frame to keep the tool normal to the cut, a means for actuating the device which includes a lost-motion, and connections between said means and the means for actuating said frame.

42. In a machine of the character described, the combination of a work-holder, a tool-holder, a support for the tool-holder, means for oscillating the support relative to the work-holder to cause the tool to cut a slot of varying radius in the work and to pass through said slot on the return stroke, a device acting on the tool-holder to hold the tool normal to the cut, a connection between the device and the oscillating means for transmitting motion from said means to said device, a motor carried by the support for withdrawing the tool on its return or idle stroke, and a feeding mechanism for feeding the tool and work with respect to each other independently of the withdrawing motor as the cutting progresses.

43. In a machine of the character described, the combination of a framework, a rocking and reciprocating frame mounted thereon, a pivot for the frame, a cam for reciprocating the frame, mechanism including a crank for rocking the frame about the pivot, a tool-holder rotatably mounted on the frame, a rocking bar acting on the tool-holder to maintain the tool normal to the cut, and means connecting the bar with said rocking mechanism for actuating said bar therefrom.

44. In a machine of the character described, the combination of a frame-work, a work-holder, a tool-holder, a frame which carries the work-holder, a rock-shaft and means which coöperate to rock and reciprocate the frame during each cut made by the tool, a main driving shaft, a gear for rocking the shaft, a connection between the shaft and gear arranged to vary the angular speed of the shaft at different parts of the stroke, and a rocking bar actuated by the gear to hold the tool normal to the cut.

45. In a machine of the character described, the combination of a vertically disposed frame, a pivot for the frame, a tool, a tool-holder carried by the frame, a cam which sustains the weight of the frame and also reciprocates it, a crank and pin for rocking the frame about the pivot and causing the tool to retrace its path through the work on the return or idle stroke, a driving means which moves the tool faster on the return stroke than on the cutting stroke, and a device carried by the frame and connected to said driving means for retracting the tool to clear the work during the return stroke and for advancing it to cutting position for the active stroke.

46. The combination of a cutting tool and a work-holder, a device for feeding one of them toward the other as the cutting progresses, means for giving them a relative movement in one direction in a curved path in a plane at right angles to the direction of the feed to cut the work and a similar movement in the opposite direction to return the parts to their starting position, and mechanism actuated by said means for causing one of them to advance and recede at different portions of said movement.

47. The combination of a cutting tool and a work-holder, means for feeding one of them toward the other as the cutting progresses, means for giving them a relative oscillating movement in a curved path in a plane at right angles to the direction of the feed, and means controlled by said feeding means for causing one of them to advance and recede at different portions of said movement.

48. In a machine for cutting slots having curved sides across the edge of a disk, ring or a segment thereof by successive cuts, the combination of a holder for said disk, ring or segment, a main frame, a cutter bar or frame and acting on the other end of the bar one end, a pivot for the bar which is mounted on the main frame and engages said slot, guides on the frame for causing said bar to move in a plane parallel to a tangent to said disk, ring or segment, a tool holder mounted on the bar intermediate its ends, a tool or cutter carried by the holder which projects therefrom and has its cutting edge located in a plane parallel to the plane of movement of the bar, means mounted on the frame and acting on the other end of the bar for rocking and reciprocating it in relation to its pivot to move said cutting edge in a curved path in its plane of movement, and mechanism for feeding the tool and work relative to each other as the cutting progresses.

In witness whereof, I have hereunto set my hand this 26th day of June, 1903.

JOHN RIDDELL.

Witnesses:
 EDWARD WILLIAMS, Jr.,
 MARCUS L. BYNG.

Copies of this patent may be obtained for five cents each, by addressing the "Commissioner of Patents, Washington, D. C."